US010008041B2

(12) United States Patent
Inomata

(10) Patent No.: US 10,008,041 B2
(45) Date of Patent: Jun. 26, 2018

(54) IMAGE GENERATING DEVICE, IMAGE GENERATING METHOD, AND IMAGE GENERATING PROGRAM

(71) Applicant: COLOPL, INC., Tokyo (JP)

(72) Inventor: Atsushi Inomata, Kanagawa (JP)

(73) Assignee: COLOPL, INC., Tokyo (JP)

(*) Notice: Subject to any disclaimer, the term of this patent is extended or adjusted under 35 U.S.C. 154(b) by 0 days. days.

(21) Appl. No.: 15/271,188

(22) Filed: Sep. 20, 2016

(65) Prior Publication Data
US 2017/0092006 A1   Mar. 30, 2017

(30) Foreign Application Priority Data
Sep. 29, 2015   (JP) .................................. 2015-191042

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G06F 3/013* (2013.01); *G06K 9/0061* (2013.01); *G06K 9/4671* (2013.01); *G06K 9/52* (2013.01); *G02B 2027/014* (2013.01); *G02B 2027/0141* (2013.01);
(Continued)

(58) Field of Classification Search
None
See application file for complete search history.

(56) References Cited

U.S. PATENT DOCUMENTS

| 8,379,053 | B1* | 2/2013 | Phillips | .................. G06Q 30/02 |
| | | | | 345/619 |
| 2009/0216341 | A1* | 8/2009 | Enkerud | .............. G05B 19/042 |
| | | | | 700/17 |

(Continued)

FOREIGN PATENT DOCUMENTS

| JP | 7-61257 A | 3/1995 |
| JP | 2008-210239 A | 9/2008 |

(Continued)

OTHER PUBLICATIONS

Office Action in JP Patent Application No. 2015-191042, dated Dec. 9, 2015.
(Continued)

*Primary Examiner* — Xin Sheng
(74) *Attorney, Agent, or Firm* — Hauptman Ham, LLP

(57) ABSTRACT

To display additional information in a region that a user rarely looks at, provided is an image generating device, including a processor. The processor is configured to generate an image to be displayed on a display. The processor is further unit configured to create statistical data based on a frequency that a user looks at each area of the image displayed on the display; a low frequency area identifying unit configured to identify an area in the image, which has a frequency below a threshold, as a low frequency area based on the statistical data. The processor is further configured to generate an additional image to be arranged in the low frequency area in superimposition on the image. The processor is further configured to output the image and the additional image to the display.

20 Claims, 6 Drawing Sheets

(51) Int. Cl.
*G06K 9/00* (2006.01)
*G06K 9/46* (2006.01)
*G06K 9/52* (2006.01)
*G02B 27/01* (2006.01)

(52) U.S. Cl.
CPC .............. *G06K 2009/4666* (2013.01); *G06T 2207/20076* (2013.01); *G06T 2207/20221* (2013.01)

(56) References Cited

U.S. PATENT DOCUMENTS

| | | |
|---|---|---|
| 2011/0321084 A1 | 12/2011 | Takahashi et al. |
| 2012/0054635 A1* | 3/2012 | Park ................... G06F 3/011 715/747 |
| 2013/0241952 A1* | 9/2013 | Richman ............. G06F 17/21 345/619 |
| 2015/0049002 A1* | 2/2015 | Ishikawa ........... G02B 27/0093 345/8 |
| 2015/0097866 A1 | 4/2015 | Mochizuki et al. |

FOREIGN PATENT DOCUMENTS

| | | |
|---|---|---|
| JP | 2012-10117 A | 1/2012 |
| JP | 2013-255168 A | 12/2013 |
| JP | 5465620 B2 | 4/2014 |
| JP | 2015-92237 A | 5/2015 |

OTHER PUBLICATIONS

Notice of Allowance in JP Patent Application No. 2015-191042, dated Mar. 3, 2016.

\* cited by examiner

| 1 | 1 | 0 | 0 | 0 |
| 1 | 2 | 1 | 1 | 1 |
| 3 | 2 | 2 | 1 | 0 |
| 4 | 3 | 4 | 2 | 1 |
| 5 | 5 | 5 | 4 | 2 |
| 4 | 5 | 5 | 5 | 4 |
| 2 | 4 | 5 | 4 | 3 |

| | 501 | 501 | 530 | | | | | | |
|---|---|---|---|---|---|---|---|---|---|
| | 2 | 1 | 2 | 4 | 5 | 2 | 1 | 1 | 3 |
| | 1 | 3 | 2 | 3 | 3 | 3 | 3 | 5 | 1 |
| | 2 | 1 | 2 | 4 | 5 | 4 | 3 | 4 | 3 |
| | 1 | 2 | 4 | 5 | 5 | 5 | 4 | 1 | 0 |
| 540 | 1 | 2 | 5 | 5 | 5 | 4 | 2 | 2 | 1 |
| | 2 | 3 | 4 | 3 | 4 | 2 | 1 | 1 | 1 |
| | 4 | 5 | 3 | 2 | 2 | 1 | 0 | 0 | 0 |
| | 3 | 2 | 1 | 2 | 1 | 1 | 1 | 1 | 1 |
| | 2 | 1 | 1 | 1 | 0 | 0 | 0 | 2 | 1 |
| | 2 | 1 | 2 | 1 | 0 | 0 | 1 | 3 | 2 |
| | 3 | 3 | 1 | 2 | 3 | 2 | 1 | 2 | 1 |

IMAGE GENERATING DEVICE, IMAGE GENERATING METHOD, AND IMAGE GENERATING PROGRAM

RELATED APPLICATIONS

The present application claims priority to Japanese Application Number 2015-191042, filed Sep. 29, 2015, the disclosure of which is hereby incorporated by reference herein in its entirety.

BACKGROUND

This disclosure relates to an image generating device, an image generating method, and an image generating program.

There is known a technology for displaying additional information in superimposition on a content. For example, in Japanese Patent No. 5465620, additional information is displayed in a display region determined depending on characteristics of the content.

When additional information is displayed in a region that a user rarely looks at, a new user experience may be created.

SUMMARY

This disclosure has been made in view of the above-mentioned point, and has an object to provide an image generating device, an image generating method, and an image generating program that enable additional information to be displayed in a region that a user rarely looks at, in at least one embodiment.

In order to help solve the above-mentioned problem, according to at least one embodiment of this disclosure, there is provided an image generating device, including: image generating means for generating an image to be displayed on a display; frequency statistics means for creating statistical data based on a frequency that a user looks at each part of the image displayed on the display; low frequency area identifying means for identifying an area in the image, which has the frequency that falls below a threshold, as a low frequency area based on the statistical data; additional image generating means for generating an additional image to be arranged in the low frequency area in superimposition on the image; and image outputting means for outputting the image and the additional image to the display.

Further, according to at least one embodiment of this disclosure, there is provided an image generating method, which is to be executed by a computer, the image generating method including: generating an image to be displayed on a display; outputting the image to the display; creating statistical data based on a frequency that a user looks at each part of the image displayed on the display; identifying an area in the image, which has the frequency that falls below a threshold, as a low frequency area based on the statistical data; generating an additional image to be arranged in the low frequency area in superimposition on the image; and outputting the additional image to the display.

Further, according to at least one embodiment of this disclosure, there is provided an image generating program for causing a computer to execute the procedures of: generating an image to be displayed on a display; outputting the image to the display; creating statistical data based on a frequency that a user looks at each part of the image displayed on the display; identifying an area in the image, which has the frequency that falls below a threshold, as a low frequency area based on the statistical data; generating an additional image to be arranged in the low frequency area in superimposition on the image; and outputting the additional image to the display.

According to this disclosure, additional information can be displayed in a region that a user rarely looks at.

BRIEF DESCRIPTION OF THE DRAWINGS

FIG. 3 is an example of statistical data created by a frequency statistics unit 232.

FIG. 4 is an example of statistical data created by the frequency statistics unit 232.

DETAILED DESCRIPTION

Figure 1:
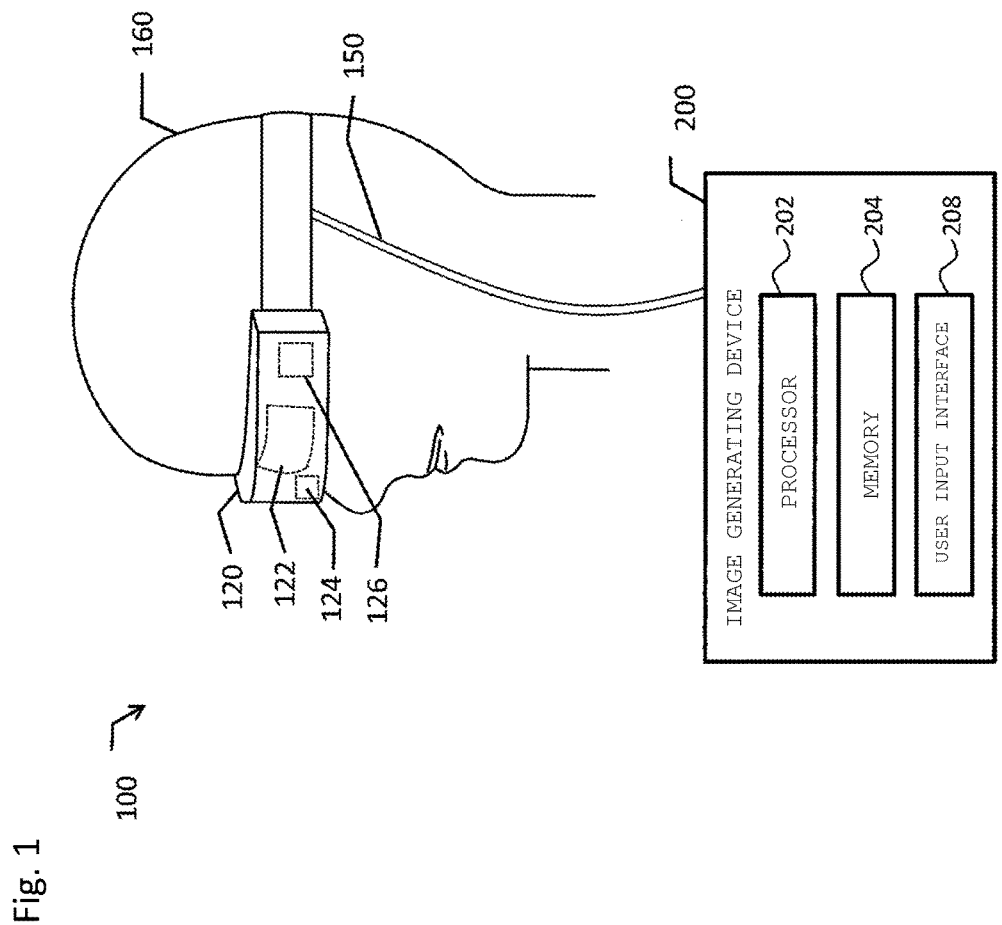
FIG. 1 is a hardware configuration diagram of an image displaying system 100 according to at least one embodiment of this disclosure.

First, contents of at least one embodiment of this disclosure are listed and described. At least one embodiment of this disclosure has the following configuration.

(Item 1) An image generating device, including: image generating means for generating an image to be displayed on a display; frequency statistics means for creating statistical data based on a frequency that a user looks at each part of the image displayed on the display; low frequency area identifying means for identifying an area in the image, which has the frequency that falls below a threshold, as a low frequency area based on the statistical data; additional image generating means for generating an additional image to be arranged in the low frequency area in superimposition on the image; and image outputting means for outputting the image and the additional image to the display.

(Item 2) An image generating device according to Item 1, in which the display includes a head mounted display, and in which the image includes a virtual reality image to be presented to a user wearing the head mounted display.

(Item 3) An image generating device according to Item 1 or 2, in which the frequency statistics means is configured to calculate the frequency based on a line-of-sight direction of the user detected by line-of-sight direction detecting means.

(Item 4) An image generating device according to Item 1 or 2, in which the frequency statistics means is configured to calculate the frequency based on output from a sensor configured to detect a direction of a head of the user.

(Item 5) An image generating device according to Item 3 or 4, in which the additional image generating means is configured to dynamically change the additional image based on one of a current line-of-sight direction of the user detected by the line-of-sight direction detecting means, and a current direction of a head of the user detected by the sensor.

(Item 6) An image generating device according to any one of Items 1 to 5, in which the low frequency area identifying means is configured to identify an area in the image, which has the frequency that falls below a first threshold, as a first low frequency area, and to identify an area in the image, which has the frequency that is equal to or exceeds the first threshold but falls below a second threshold larger than the first threshold, as a second low frequency area, and in which the additional image generating means is configured to arrange a first additional image in the first low frequency area in superimposition on the image, and to arrange a second additional image, which is different in attribute value from the first additional image, in the second low frequency area in superimposition on the image.

(Item 7) An image generating method, which is to be executed by a computer, the image generating method including: generating an image to be displayed on a display; outputting the image to the display; creating statistical data based on a frequency that a user looks at each part of the image displayed on the display; identifying an area in the image, which has the frequency that falls below a threshold, as a low frequency area based on the statistical data; generating an additional image to be arranged in the low frequency area in superimposition on the image; and outputting the additional image to the display.

(Item 8) An image generating program for causing a computer to execute the procedures of: generating an image to be displayed on a display; outputting the image to the display; creating statistical data based on a frequency that a user looks at each part of the image displayed on the display; identifying an area in the image, which has the frequency that falls below a threshold, as a low frequency area based on the statistical data; generating an additional image to be arranged in the low frequency area in superimposition on the image; and outputting the additional image to the display.

In the following, detailed description is given of at least one embodiment of this disclosure with reference to the drawings.

FIG. 1 is a hardware configuration diagram of an image displaying system 100 according to at least one embodiment of this disclosure. The image displaying system 100 includes a head mounted display (hereinafter referred to as "HMD") 120, and an image generating device 200. The HMD 120 and the image generating device 200 are, as an example, electrically connected to each other by a cable 150 so as to enable mutual communication. Instead of the cable 150, wireless connection may be used.

The HMD 120 is a display device to be used by being worn on a head of a user 160. The HMD 120 includes a display 122, an eye tracking device (hereinafter referred to as "ETD") 124, and a sensor 126. In at least one embodiment, at least one of the ETD 124 or the sensor 126 is omitted. The HMD 120 may further include a speaker (headphones) and a camera (not shown), in at least one embodiment.

The display 122 is configured to present an image in a field of view of the user 160 wearing the HMD 120. For example, the display 122 may be configured as a non-transmissive display. In this case, the sight of the outside world of the HMD 120 is blocked from the field of view of the user 160, and the user 160 can see only the image displayed on the display 122. On the display 122, for example, an image generated using a computer executing graphics software is displayed. therein at least one embodiment, the generated image is a virtual reality image obtained by forming an image of a space of virtual reality (for example, a world created in a computer game). Alternatively, the real world may be expressed by the computer executing the graphics software based on positional coordinate data of, for example, the actual geography or objects in the real world. Further, instead of the computer executing the graphics software, the camera (not shown) mounted on the HMD 120 may be used to display on the display 122 a video taken from the perspective of the user 160.

The ETD 124 is configured to track the movement of the eyeballs of the user 160, to thereby detect the direction of the line of sight of the user 160. For example, the ETD 124 includes an infrared light source and an infrared camera. The infrared light source is configured to irradiate the eye of the user 160 wearing the HMD 120 with infrared rays. The infrared camera is configured to take an image of the eye of the user 160 irradiated with the infrared rays. The infrared rays are reflected on the surface of the eye of the user 160, but the reflectance of the infrared rays differs between the pupil and a part of the eyeball other than the pupil. In the image of the eye of the user 160 taken by the infrared camera, the difference in reflectance of the infrared rays appears as contrast in the image. Based on this contrast, the pupil is identified in the image of the eye of the user 160, and further the direction of the line of sight of the user 160 is detected based on the position of the identified pupil. The line-of-sight direction of the user 160 represents an area that the user 160 is gazing at in the image displayed on the display 122.

The sensor 126 is a sensor configured to detect the direction of the head of the user 160 wearing the HMD 120. Examples of the sensor 126 include a magnetic sensor, an angular velocity sensor, an acceleration sensor, or a combination thereof. When the sensor 126 is a magnetic sensor, an angular velocity sensor, or an acceleration sensor, the sensor 126 is built into the HMD 120, and is configured to output a value (magnetic, angular velocity, or acceleration value) based on the direction or the movement of the HMD 120. By processing the value output from the sensor 126 by an appropriate method, the direction of the head of the user 160 wearing the HMD 120 is calculated. The direction of the head of the user 160 can be used to change a display image of the display 122 so as to follow the movement of the head of the user 160 when the head is moved. When the display image of the display 122 is changed in accordance with the movement of the head of the user 160, the direction of the head of the user 160 represents a rough indication of a part that the user 160 is viewing at a relatively high probability in the display image of the display 122.

The sensor 126 may be a sensor provided outside of the HMD 120. For example, the sensor 126 may be an infrared sensor separated from the HMD 120. When an infrared reflecting marker formed on the surface of the HMD 120 is detected with use of the infrared sensor, the direction of the head of the user 160 wearing the HMD 120 can be identified.

The image generating device 200 is a device configured to generate an image to be displayed on the HMD 120. The image generating device 200 at least includes a processor 202, a non-transitory memory 204, and a user input interface 208. As other components, the image generating device 200 may further include, for example, a network interface (not shown) configured to communicate with other devices via a network. The image generating device 200 may be achieved as, for example, a personal computer, a game console, a smart phone, a tablet terminal, and the like.

The memory 204 has stored therein at least an operating system and an image generating program. The operating system is a computer program for controlling the entire operation of the image generating device 200. The image generating program is a computer program for the image generating device 200 to achieve respective functions of image generating processing to be described later. The memory 204 can further temporarily or permanently store data generated by the operation of the image generating device 200. Specific examples of the memory 204 include a read only memory (ROM), a random access memory (RAM), a hard disk, a flash memory, and an optical disc.

The processor 202 is configured to read out a program stored in the memory 204, to thereby execute processing in accordance with the program. When the processor 202 executes the image generating program stored in the memory 204, various functions of the image generating processing to be described later are achieved. The processor 202 includes at least a central processing unit (CPU) and a graphics processing unit (GPU).

The user input interface 208 is configured to receive input for operating the image generating device 200 from the user of the image displaying system 100. Specific examples of the user input interface 208 include a game controller, a touch pad, a mouse, and a keyboard.

Figure 2:
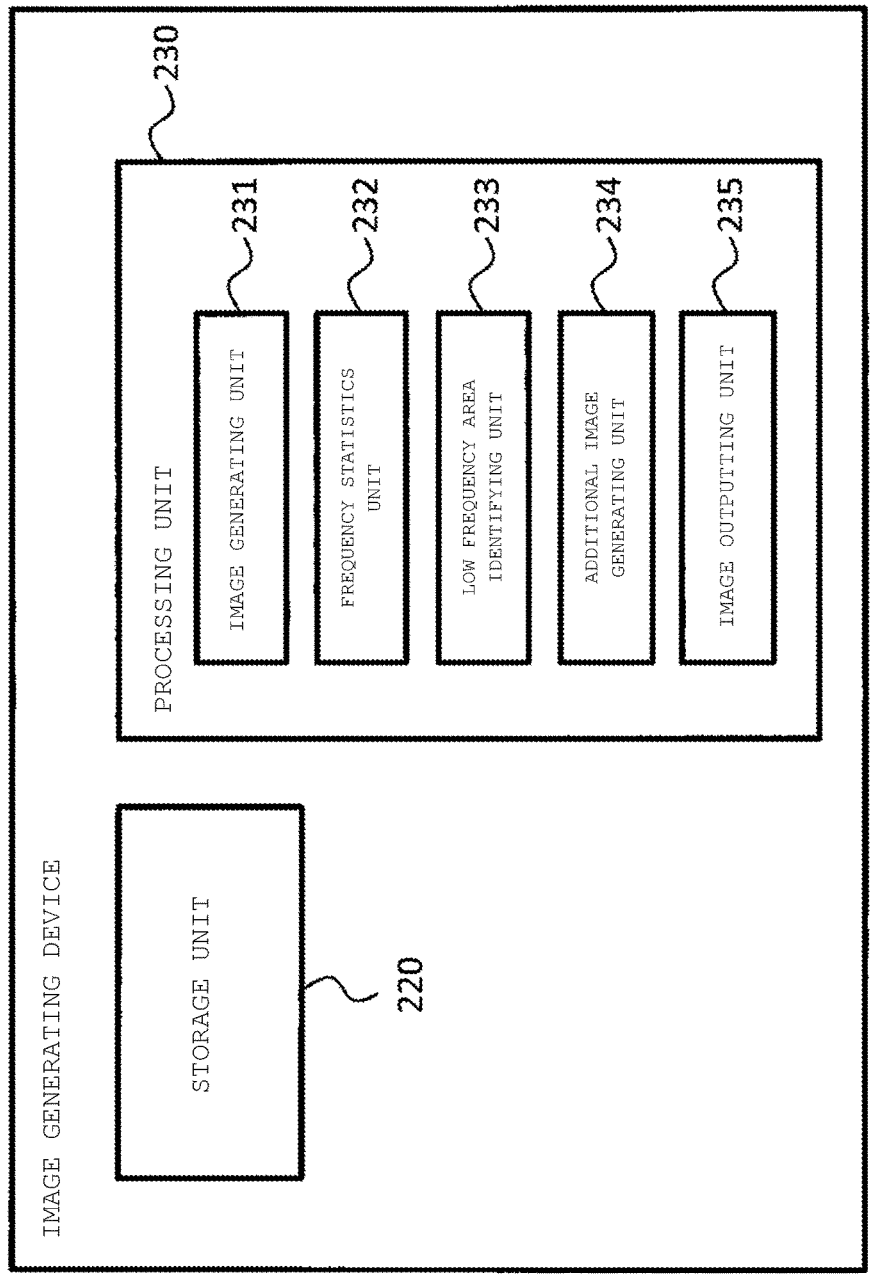
FIG. 2 is a block diagram for illustrating a functional configuration of an image generating device 200 according to at least one embodiment of this disclosure.

FIG. 2 is a block diagram for illustrating a functional configuration of the image generating device 200 according to at least one embodiment of this disclosure. The image generating device 200 includes a storage unit 220 and a processing unit 230. The processing unit 230 further includes an image generating unit 231, a frequency statistics unit 232, a low frequency area identifying unit 233, an additional image generating unit 234, and an image outputting unit 235. In at least one embodiment, the storage unit 220 corresponds to the memory 204 illustrated in FIG. 1. The processing unit 230 and the respective units 231 to 235 included in the processing unit 230 represent the functions of the image generating processing according to this disclosure, which are achieved by reading out the image generating program stored in the memory 204 and executing the image generating program by the processor 202 illustrated in FIG. 1, in at least one embodiment.

The image generating unit 231 is configured to generate an image to be displayed on the HMD 120. For example, the image generating unit 231 is configured to acquire predetermined data from the storage unit 220, to thereby generate an image by computer graphics processing based on the acquired data. As at least one example, the image generating unit 231 may generate such a virtual reality image that the user 160 wearing the HMD 120 can recognize a virtual reality space of a computer game. The virtual reality image represents a sight that the user can see in the virtual reality space. For example, the virtual reality image to be generated by the image generating unit 231 includes characters that appear in the computer game, a landscape including buildings and trees, an interior design inside a room including furniture and walls, items on the ground, a part (hand or foot) of a body of an avatar that the user is operating, and an object (gun or sword) that the avatar is holding in its hand. Further, the image generating unit 231 may generate a computer graphics image that reproduces the real world based on the actual geography data of the real world or the like. Further, the image to be generated by the image generating unit 231 may be, instead of one obtained by computer graphics processing, for example, a video taken from the perspective of the user 160 by an external camera mounted on the HMD 120.

The image generating unit 231 may further change an image based on the output value from the sensor 126. For example, the image to be generated by the image generating unit 231 may be an image representing a state in which the field of view of the user in the virtual reality space transitions so as to follow the movement of the head of the user 160, which is represented by the output value from the sensor 126.

The image generated by the image generating unit 231 is output to the HMD 120 via the image outputting unit 235, to thereby be displayed on the display 122.

The frequency statistics unit 232 is configured to create statistical data based on a frequency that the user 160 wearing the HMD 120 looks at each area of the image displayed on the display 122. The statistical data represents an area that is frequently looked at and an area that is not frequently looked at in the image displayed on the display 122. For example, the frequency statistics unit 232 is configured to create the statistical data of the frequency that the user 160 looks at each area of the image based on the line-of-sight direction of the user 160 detected by the ETD 124. Further, the frequency statistics unit 232 may create the statistical data of the frequency that the user 160 looks at each area of the image based on the direction of the head of the user 160 detected by the sensor 126. Specific description is given with reference to FIG. 3 and FIG. 4.

FIG. 3 is an illustration of a display image 520 to be displayed on the display 122 of the HMD 120. The display image 520 includes a plurality of partial regions 501. In the example of FIG. 3, the partial region 501 is a small image range obtained one by one by vertically and laterally dividing the display image 520 like a grid. The user 160 wearing the HMD 120 gazes at a certain partial region 501 in the display image 520 at a certain moment, and then gazes at a different partial region 501 at a different moment. The line of sight of the user 160 moves back and forth between different partial regions 501 of the display image 520 along with elapse of time. The line-of-sight direction of the user 160 that changes repeatedly is detected by the ETD 124 to be input to the frequency statistics unit 232.

Each of the partial regions 501 of FIG. 3 has a number from "0" to "5". The number represents a frequency value based on how often the user gazes at the partial region 501. For example, a frequency value "0" represents that the user 160 has never looked at the partial region 501. Further, a frequency value "1" represents that the user 160 has looked at the partial region 501 at a low frequency, and a frequency value "5" represents that the user 160 has looked at the partial region 501 at the maximum frequency. Intermediate frequency values "2", "3", and "4" represent frequencies obtained by proportionally dividing the frequency values "1" and "5" as appropriate. The frequency statistics unit 232 is configured to collect the line-of-sight directions of the user 160 input from the ETD 124 for a predetermined time period, and to assign a frequency value for each partial region 501 in accordance with the collection result. For example, the frequency statistics unit 232 is configured to assign the frequency value "5" to a partial region 501 that is classified into a group in which the line of sight of the user 160 stays for the longest time during the time period, and to assign the frequency value "4" to a partial region 501 that is classified into a group in which the line of sight of the user 160 stays for the next longest time. Other frequency values are similarly assigned.

FIG. 4 is an illustration of a region 540 that is wider than a region 530 that can be displayed at once on the display 122 of the HMD 120. The region 540 represents, for example, the entire sight that the user can see around him/her in a virtual reality space of a computer game. The display range 530 represents a sight in a limited range that the user can view at a single time when the user turns to a certain direction in the virtual reality space. The display range 530 corresponds to the range of the display image 520 of FIG. 3. For example, when the user 160 moves his/her head to various directions, the display range 530 moves in the region 540 so as to follow the movement of the head.

As illustrated in FIG. 4, the region 540 includes a plurality of partial regions 501 similarly to the case described in FIG. 3. The head of the user 160 wearing the HMD 120 is directed to a certain direction in a certain time zone. While the head of the user 160 is directed in the certain direction, similarly to the case described in FIG. 3, the frequency values are assigned to the partial regions 501 included in the display range 530 at that time. Further, the head of the user 160 is directed to a different direction in a different time zone. While the head of the user 160 is directed in the different direction, frequency values are similarly assigned to the partial regions 501 included in the display range 530 at that time. When the display ranges 530 in the two time zones partially overlap with each other, for example, the frequency value is assigned to each partial region 501 based on a total time during which the line of sight of the user 160 stays in the overlapped partial region 501.

In the example in which the display range 530 moves in the region 540 as in FIG. 4, the frequency value of each partial region 501 may be determined based on the direction of the head of the user 160. For example, when the user 160 moves his/her head, the sensor 126 detects the direction of the head of the user 160, and the image generating unit 231 generates an image in the display range 530 based on the direction. At this time, the actual line of sight of the user 160 may be obtained in arbitrary parts of the generated image, but in some instances the user 160 is looking at a predetermined fixed part of the display range 530 (for example, center of the display range 530). The frequency statistics unit 232 assumes that the direction of the fixed part of the display range 530 is the line-of-sight direction of the user 160, to thereby determine the frequency value of each partial region 501. For example, the frequency statistics unit 232 tracks the state of the display range 530 moving in the region 540 for a predetermined time period, and assigns a large frequency value to a partial region 501 that overlaps with the center of the display range 530 for a long time and assigns a small frequency value to a partial region 501 that overlaps with the center of the display range 530 for a short time.

As described above, the frequency values of the respective partial regions 501 are statistically collected based on the line-of-sight direction or the head direction of the user 160. The collected frequency values of the respective partial regions 501 form the statistical data. The statistical data may be stored in the storage unit 220.

The dotted lines (frame lines of the partial regions 501) and the numbers (frequency values) shown in FIG. 3 and FIG. 4 are presented for the description above, and are not elements of the image. Therefore, neither the dotted lines nor the numbers are displayed on the display 122 of the HMD 120.

The low frequency area identifying unit 233 is configured to identify a low frequency area based on the statistical data created by the frequency statistics unit 232. The low frequency area is a partial area that is looked at by the user 160 at a low frequency in the image displayed on the display 122 of the HMD 120. For example, the low frequency area identifying unit 233 is configured to compare the frequency value of each partial region 501 forming the statistical data with a predetermined threshold, and to determine, when the frequency value of a certain partial region 501 falls below the threshold as a result of the comparison, that the partial region 501 is a part of the low frequency area.

Figure 5:
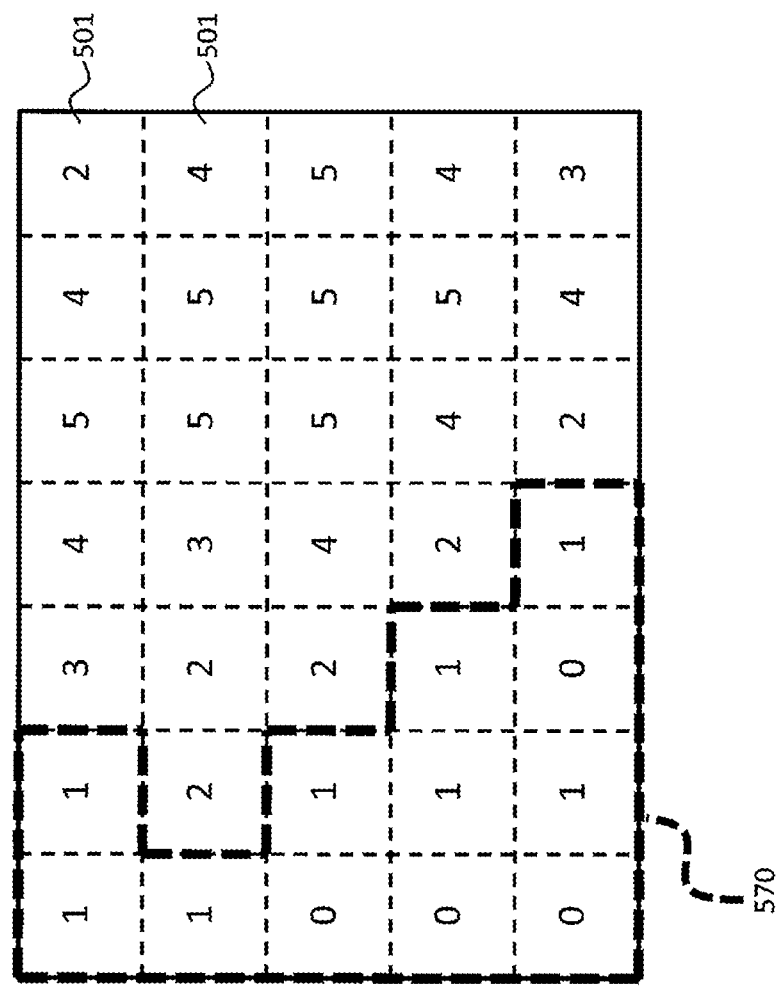
FIG. 5 is an example of a low frequency area.

FIG. 5 is an example of the low frequency area. This example corresponds to the example of the frequency values of the respective partial regions 501 illustrated in FIG. 3. A low frequency area 570 exemplified in FIG. 5 is an area formed of partial regions 501 to which the frequency value "0" or "1" is assigned in FIG. 3. As another example, the low frequency area may include partial regions 501 to which the frequency value "0", "1", or "2" is assigned.

Further, the low frequency area identifying unit 233 may be configured to classify the low frequency area into a plurality of stages depending on the frequency value. For example, the low frequency area identifying unit 233 may be configured to set partial regions 501 having the frequency value of "0" or "1" as a first low frequency area, and to set partial regions 501 having the frequency value of "2" or "3" as a second low frequency area.

The additional image generating unit 234 is configured to generate an additional image to be arranged in the low frequency area. The generated additional image is output to the HMD 120 via the image outputting unit 235, and is displayed on the display 122 in superimposition on the image output from the image generating unit 231. The additional image can be used for, for example, presenting advertisements in the virtual reality space, or displaying an enemy character or a useful item in a computer game. The additional image is displayed in the low frequency area that is looked at by the user 160 at a low frequency, and hence the user 160 can visually recognize the image output from the image generating unit 231 without being affected by the additional image that much. In contrast, for example, when there is assumed such a rule that an additional image having a high value for the user 160 may be displayed in the low frequency area, the attention of the user 160 can be directed not only to the image output from the image generating unit 231 (area other than the low frequency area), but also to the low frequency area. For example, in an example of a computer game, when a high-value rare item or an enemy character that provides a high score when being defeated is displayed in the low frequency area as the additional image, the game can be more amusing.

Further, the additional image generating unit 234 may dynamically change the additional image based on the current line-of-sight direction or the current head direction of the user 160. For example, first, a certain character (ghost or mole in a whack-a-mole game) is displayed in the low frequency area as the additional image. The additional image generating unit 234 determines whether or not the user 160 intends to (or is about to) direct his/her line of sight (or his/her head) to the low frequency area based on the input from the ETD 124 or the sensor 126. When the user 160 intends to direct his/her line of sight to the low frequency area, the additional image generating unit 234 changes the additional image of the character to, for example, such an additional image that the character is escaping from the line of sight of the user 160 (the ghost disappears from the field of view, or the mole hides into the ground). The escaping degree of the character may be adjusted depending on the degree that the line of sight of the user 160 approaches the low frequency area.

When the low frequency area is classified into a plurality of stages, the additional image generating unit 234 may further generate different additional images (first additional image, second additional image, and the like) for the respective classified low frequency areas (first low frequency area, second low frequency area, and the like). For example, an attribute value of the first additional image to be displayed in the first low frequency area differs from an attribute value of the second additional image to be displayed in the second low frequency area. As an example, when the first low frequency area corresponds to the frequency values "0" and "1", and the second low frequency area corresponds to the frequency values "2" and "3", in the first low frequency area that is an area that is looked at by the user 160 at a lower frequency, a rare item with a higher value or an enemy character that provides a higher score when being defeated may be displayed as the first additional image. In this manner, the game can be even more amusing.

Figure 6:
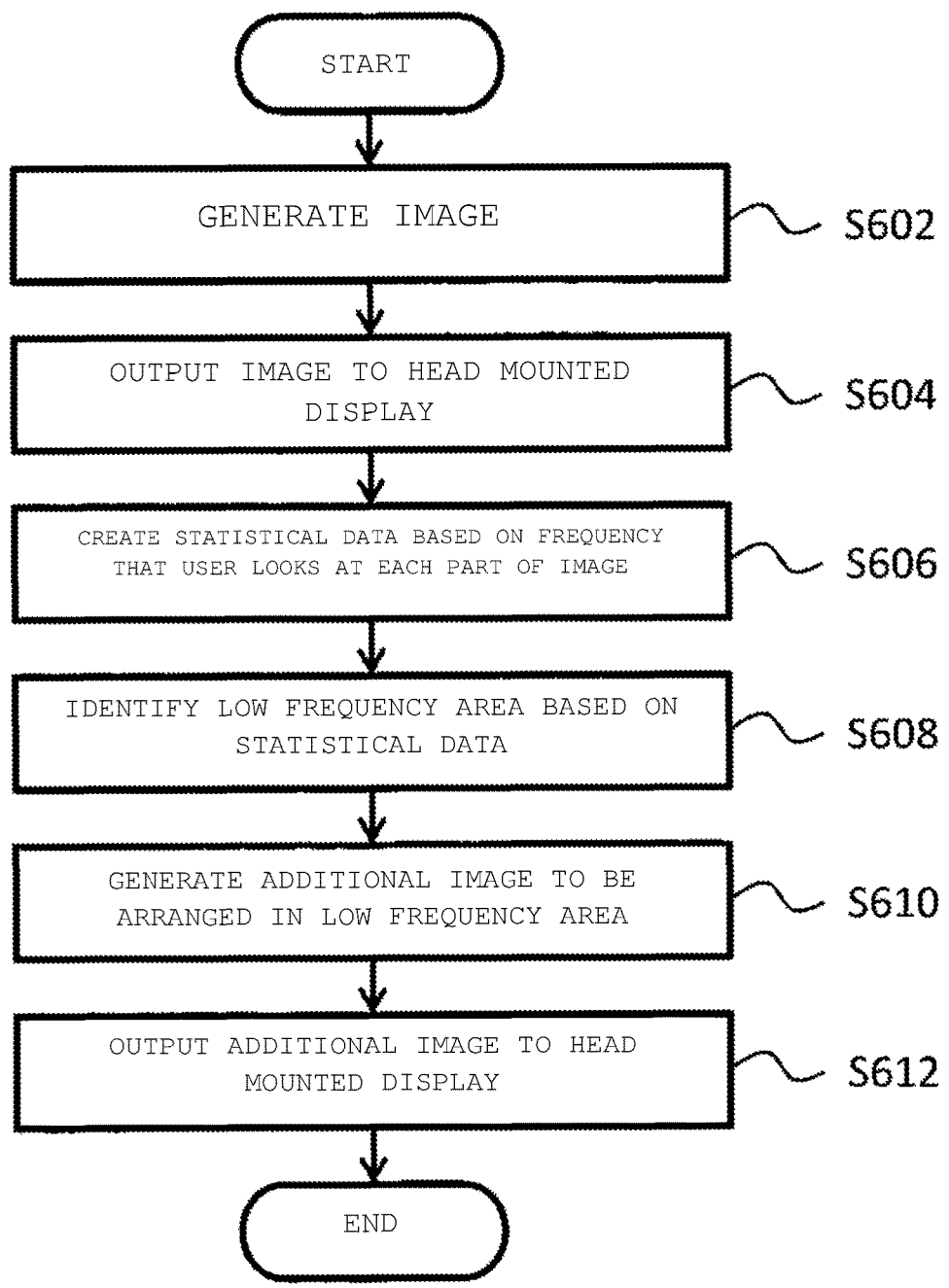
FIG. 6 is a flowchart for illustrating a processing procedure of the image generating device 200 according to at least one embodiment of this disclosure.

FIG. 6 is a flow chart for illustrating a processing procedure of the image generating device 200 according to one embodiment of this disclosure. First, in Step S602, the image generating unit 231 of the image generating device 200 generates an image to be displayed on the HMD 120. Next, in Step S604, the image outputting unit 235 of the image generating device 200 outputs the image generated by the image generating unit 231 to the HMD 120. With this, the image is displayed on the display 122 of the HMD 120. Next, in Step S606, the frequency statistics unit 232 of the image generating device 200 creates statistical data based on the frequency that the user 160 wearing the HMD 120 looks at each part of the image displayed on the display 122. For example, the frequency statistics unit 232 of the image generating device 200 determines the frequency value of each partial region based on the line-of-sight direction of the user 160 detected by the ETD 124, or based on the direction of the head of the user 160 detected by the output value from the sensor 126. Next, in Step S608, the low frequency area identifying unit 233 of the image generating device 200 identifies the low frequency area that is looked at by the user 160 at a low frequency based on the statistical data created by the frequency statistics unit 232. Next, in Step S610, the additional image generating unit 234 of the image generating device 200 generates the additional image to be arranged in the low frequency area. Next, in Step S612, the image outputting unit 235 of the image generating device 200 outputs the additional image generated by the additional image generating unit 234 to the HMD 120. With this, the additional image is displayed in the low frequency area in superimposition on the image displayed on the display 122 of the HMD 120.

While a description has been given above on the embodiment of this disclosure, this disclosure is not limited thereto, and various modifications can be made without departing from the spirit of this disclosure.

What is claimed is:
1. An image generating device, comprising:
 a processor configured to execute instructions, wherein the processor is configured to:
  generate an image to be displayed on a display in a virtual reality (VR) space;
  create statistical data based on a frequency that a user looks at each area of the image displayed on the display using a viewing frequency grid corresponding to the generated image;
  identify an area in the image, which has a frequency below a threshold, as a low frequency area based on the statistical data;
  generate an additional image to be arranged in the low frequency area in superimposition on the image; and
  output the image and the additional image to the display,
 wherein the display comprises a non-transmissive head mounted display, and
 wherein the image comprises a virtual reality image to be presented to the user wearing the non-transmissive head mounted display.

2. An image generating device according to claim 1, wherein processor is configured to calculate the frequency based on a line-of-sight direction of the user detected by a line-of-sight direction detector.

3. An image generating device according to claim 2, wherein the processor is configured to dynamically change the additional image based on at least one of a current line-of-sight direction of the user detected by the line-of-sight direction detector or a current direction of a head of the user detected by a sensor.

4. An image generating device according to claim 1, wherein the processor is configured to calculate the frequency based on output from a sensor configured to detect a direction of a head of the user.

5. An image generating device according to claim 1,
 wherein the processor is configured to identify a first area in the image, which has a frequency below a first threshold, as a first low frequency area, and to identify a second area in the image, which has the frequency equal to or exceeding the first threshold but below a second threshold, as a second low frequency area, the second threshold is larger than the first threshold, and
 to arrange a first additional image in the first low frequency area in superimposition on the image, and arrange a second additional image, which is different in attribute value from the first additional image, in the second low frequency area in superimposition on the image.

6. An image generating device according to claim 5, wherein the processor is further configured to:
 generate the first additional image having a higher attribute value to the user than the second additional image.

7. An image generating device according to claim 1, wherein the additional image is an advertisement.

8. An image generating device according to claim 1, wherein the processor is further configured to:
 detect a change in a line-of-sight direction by the user; and
 alter the additional image based on the detected change in the line-of-sight direction.

9. An image generating device according to claim 8, wherein the processor is configured to:
 alter the additional image based on a magnitude of the detected change in the line-of-sight direction.

10. An image generating device according to claim 1, wherein the processor is configured to create the statistical data based on eye tracking information.

11. An image generating method, which is to be executed by a computer, the image generating method comprising:
 generating an image to be displayed on a display in a virtual reality (VR) space; outputting the image to the display;
 creating statistical data based on a frequency that a user looks at each area of the image displayed on the display, wherein the creating of the statistical data comprises:
 dividing the image output to the display into a viewing frequency grid, and
 monitoring a frequency a user looks at each partial region of the viewing frequency grid using an eye-tracking device;
 identifying an area in the image, which has a frequency below a threshold, as a low frequency area based on the statistical data;
 generating an additional image to be arranged in the low frequency area in superimposition on the image; and
 outputting the additional image to the display, wherein the display comprises a non-transmissive head mounted display, and wherein the image comprises a virtual reality image to be presented to the user wearing the non-transmissive head mounted display.

12. An image generating method according to claim 11, wherein outputting the additional image comprises outputting the additional image to the low frequency area, and the additional image has a high attribute value for the user.

13. An image generating method according to claim 11, further comprising:

generating a second additional image based on the statistical data;

outputting the second additional image to the display; and displaying the additional image and the second additional image simultaneously.

14. An image generating method according to claim 13, wherein displaying the additional image comprises displaying the additional image having a higher attribute value than the second additional image.

15. An image generating method according to claim 14, wherein displaying the additional image comprises displaying the additional image in a lower frequency area than an area in which the second additional image is displayed.

16. A non-transitory computer readable medium for storing an image generating program for causing a computer to execute the procedures of:

generating an image to be displayed on a display in a virtual reality (VR) space;

outputting the image to the display;

creating statistical data based on a frequency that a user looks at each area of the image displayed on the display using a viewing frequency grid corresponding to the generated image, wherein the creating of the statistical data comprises:

monitoring a frequency with which a user views a partial region of the image output to the display by detecting line-of-sight directions of the user;

identifying an area in the image, which has a frequency below a threshold, as a low frequency area based on the statistical data;

generating an additional image to be arranged in the low frequency area in superimposition on the image; and outputting the additional image to the display, wherein the display comprises a non-transmissive head mounted display, and wherein the image comprises a virtual reality image to be presented to the user wearing the non-transmissive head mounted display.

17. A non-transitory computer readable medium according to claim 16, wherein the stored image generating program is configured to cause the computer to output the additional image to the low frequency area, and the additional image has a high attribute value for the user.

18. A non-transitory computer readable medium according to claim 16, wherein the stored image generating program is configured to cause the computer to:

generate a second additional image based on the statistical data;

output the second additional image to the display; and display the additional image and the second additional image simultaneously.

19. A non-transitory computer readable medium according to claim 18, wherein the stored image generating program is configured to cause the computer to display the additional image having a higher attribute value than the second additional image.

20. A non-transitory computer readable medium according to claim 18, wherein the stored image generating program is configured to cause the computer to display the additional image in a lower frequency area than an area in which the second additional image is displayed.

* * * * *